J. WELLS.
DUMPING-WAGON.

No. 175,398. Patented March 28, 1876.

WITNESSES:
Chas. Nida
A. F. Perry

INVENTOR:
Jared Wells
BY
ATTORNEYS.

N. PETERS, PHOTO-LITHOGRAPHER, WASHINGTON, D. C.

UNITED STATES PATENT OFFICE.

JARED WELLS, OF GRAND RAPIDS, MICHIGAN.

IMPROVEMENT IN DUMPING-WAGONS.

Specification forming part of Letters Patent No. 175,398, dated March 28, 1876; application filed September 17, 1875.

*To all whom it may concern:*

Figure 1:
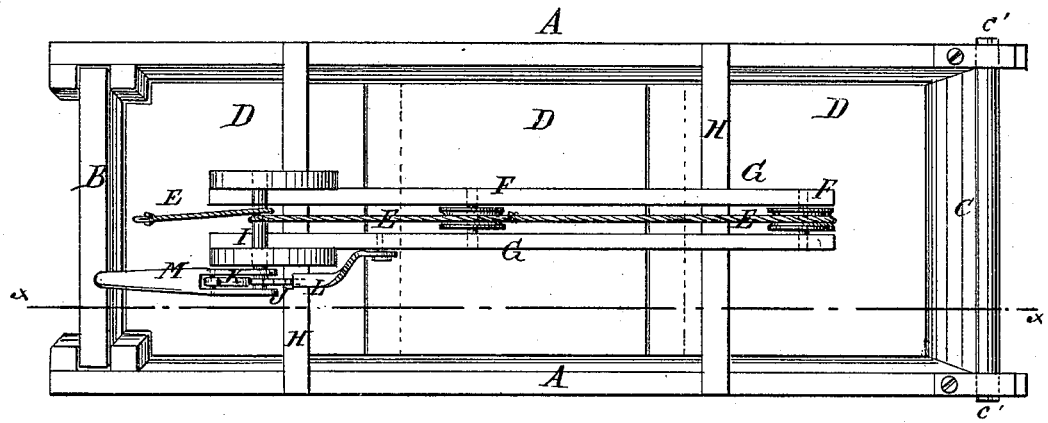
Figure 2:
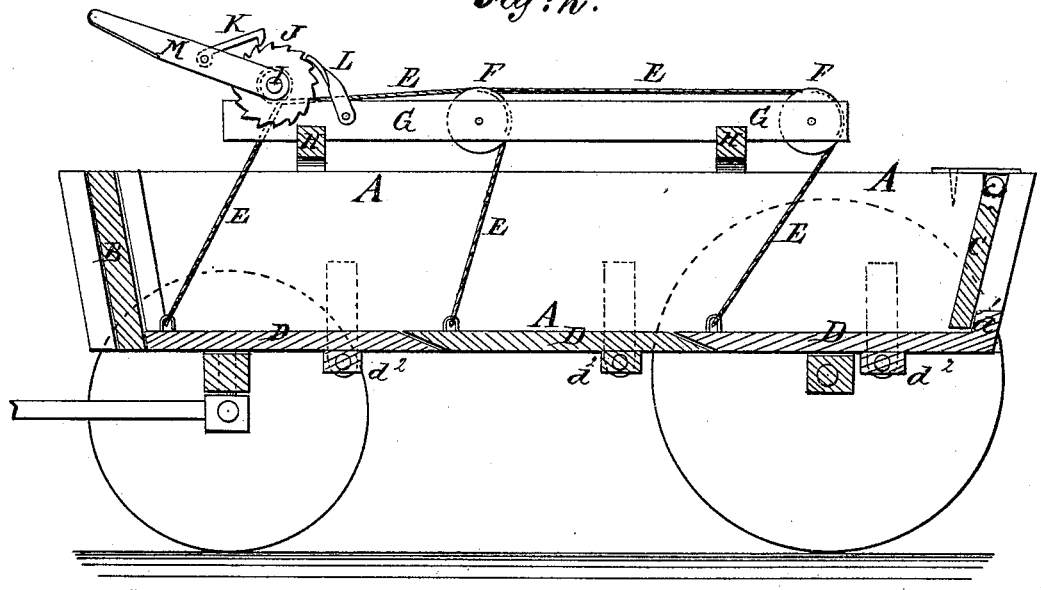

Be it known that I, JARED WELLS, of Grand Rapids, in the county of Kent and State of Michigan, have invented a new and useful Improvement in Dumping-Wagon Box, of which the following is a specification:

Figure 1 is a top view of my improved wagon-box. Fig. 2 is a vertical longitudinal section of the same, taken through the line $x$ $x$, Fig. 1.

Similar letters of reference indicate corresponding parts.

The object of this invention is to furnish an improved wagon box or body, which shall be so constructed as to allow its load to be easily and conveniently dumped, and which shall be simple in construction and reliable in use.

The invention consists in the combination of the pivoted end board, the pivoted sectional bottom, the chains, the guide-pulleys, the shaft, the ratchet-wheel, the lever pawl, the stop-pawl, and the supporting-bars, with the side boards of a wagon-box, as hereinafter fully described.

A are the side boards of the wagon-box, the lower edges of which rest upon the bolsters or axles of the wagon. B is the forward end board, the end edges of which are inserted in grooves formed by attaching cleats to the inner sides of the forward ends of the side boards A. C is the rear end-board, which has gudgeons or pivots $c'$ attached to or formed upon the upper parts of its end edges, which enter and work in notches in the upper edges of the rear parts of the side boards A. The lower edge of the swinging end board C rests against a cleat, $d^1$, attached to the upper side of the rear end of the rear section D of the bottom. The bottom of the wagon-box is made in three or more sections, D, to the lower sides of which, between their centers and rear ends, are attached cross-bars $d^2$, the ends of which work in bearings attached to the side boards A. The forward edge of each section D, except the forward one, is beveled off upon its lower side, and the rear edge of each section D, except the rear one, is beveled off upon its upper side to receive the forward beveled edge of the following section, as shown in Fig. 2. To the upper side of the forward part of each section D is attached the lower end of a chain, E. The chains E pass over guide-pulleys F pivoted to and between the two bars G, which are attached to the cross-bars H, the ends of which rest upon, and are secured to, the upper edges of the side boards A. The forward end of each rear chain E may be attached to the preceding chain, and the forward end of the forward chain attached to a short shaft, I, which works in bearings attached to the forward ends of the bars G.

To one of the journals of the shaft I is attached a ratchet-wheel, J, with the teeth of which engage the pawls K L. The pawl K is pivoted to the lever M, the lower end of which is pivoted to the journal of the shaft I.

By this construction, by operating the lever M, the shaft I will be turned to wind up the chains E, and thus raise the forward ends of the sections D sufficiently to cause the load to slide from their rear ends. The forward chain E may be attached directly to the shaft I without passing over any guide-pulley. The pawl L is pivoted to one of the bars G, and is designed to prevent the shaft I from being turned back by the weight of the load upon the sections D while the pawl K M is being moved back for another stroke.

Having thus described my invention, I claim as new and desire to secure by Letters Patent—

The bottom of a wagon-body made in three sections, D D D, and having on the rear one a cleat, $d^1$, combined with a tail-gate pivoted near the top, as and for the purpose specified.

JARED WELLS.

Witnesses:
L. BEMENT,
WILLIAM LEPPIG.